United States Patent [19]
Yamagishi et al.

[11] Patent Number: 6,137,638
[45] Date of Patent: Oct. 24, 2000

[54] PROJECTION ZOOM LENS SYSTEM AND PROJECTOR APPARATUS

[75] Inventors: Akira Yamagishi, Nagano, Japan; Jeffrey A. Gohman, Hillsboro, Oreg.

[73] Assignees: Nittoh Kogaku K.K., Japan; InFocus Corporation, Wilsonville, Oreg.

[21] Appl. No.: 09/363,239

[22] Filed: Jul. 28, 1999

[51] Int. Cl.$^7$ .............................. G02B 15/14; G02B 3/00; G02B 9/60

[52] U.S. Cl. .......................... 359/682; 359/680; 359/649; 359/686; 359/770

[58] Field of Search ................................. 359/680–682, 359/686, 770, 649, 650

[56] References Cited

U.S. PATENT DOCUMENTS

| | | | |
|---|---|---|---|
| 5,805,350 | 9/1998 | Yamamoto | 359/680 |
| 6,008,952 | 9/1998 | Yamamoto | 359/686 |

FOREIGN PATENT DOCUMENTS 11-95098  4/1999  Japan .

Primary Examiner—Huang Xuan Dang
Assistant Examiner—Evelyn A. Lester
Attorney, Agent, or Firm—Stoel Rives LLP

[57] ABSTRACT

A projection zoom lens system of the present invention having telecentric incident side is suitable for a projector apparatus using LCD or DMD with prism. The projection zoom lens system of this invention comprises five lens groups having, from the screen side, negative, positive, positive, negative and positive power. In addition to this arrangement, since the lens located closest to the screen is a screen side convex negative meniscus lens, wide-angled and bright zoom lens system can be realized. Further, by designing the distribution of power of the first lens group located closest to the screen, the projection zoom lens provides further improved aberration correction. As the condition for realizing the aforementioned projection zoom lens system, it is preferable that a focal length f1 of the first lens group and a focal length at a wide-angle end fw satisfy the following condition:

$$-1.9 < f1/fw < -0.9 \quad (A).$$

4 Claims, 7 Drawing Sheets

PROJECTION ZOOM LENS SYSTEM AND PROJECTOR APPARATUS

BACKGROUND OF INVENTION

1. Technical Field

The present invention relates to a projection zoom lens system of a projector apparatus for projecting a magnified image displayed on a light valve onto a screen.

2. Description of the Related Art

FIG. 7 shows a schematic structure of a typical three-plate type liquid crystal (LCD) projector. A projector apparatus 8 for projecting a magnified image onto a screen or the like includes a projection zoom lens system 1 for projecting an image supplied from incident side onto the screen, and an image forming apparatus 7 for supplying the image to the projection zoom lens system 1. In the LCD projector apparatus, LCD 3 is employed as a light valve of the image forming apparatus 7. The projector apparatus 8 shown in FIG. 7 includes a white light source 6, dichroic mirrors 5R and 5G for color-separating the light from the light source 6, liquid crystal panels 3R, 3G and 3B. LCD's are light through type display medium (light valve) and an image of each color, namely red, green and blue are generated respectively. Images formed by these LCD's 3R, 3G and 3B are introduced into a dichroic prism 2 by a mirror 4, color-compounded and led to the incidence side of the projection lens system 1. Then, images displayed by the LCD light valves 3B, 3G and 3R are magnified and compounded and projected onto a screen 9.

The projection zoom lens system used in such a LCD projector must have a long back focus for inserting the dichroic prism 2. That is, since the characteristics of dichroic prism largely depends on an incident angle because of spectral characteristics, the liquid crystal panel side, namely the incidence side of the projection lens system 1 has to be telecentric. Further, not only in the above three-plate type image-forming apparatus, but also in any image-forming apparatus using LCD light valve, it is preferable to apply the projection lens system having the telecentric incidence side. Because the visual angle of the liquid crystal panel is relatively small, the image quality depends highly on the angle.

In recent years, in place of the liquid crystal panels, the apparatus having a plurality of elements for forming an image by mechanically changing reflecting direction of light using microelectromechanical systems have been brought into practical use. One of examples of such apparatus is a DMD (digital mirror device, deformation micro-foil device or display) in which fine mirrors (micro mirrors) are arranged into an array in correspondence with pixels for displaying image by controlling angle of each of the mirrors. An image-forming apparatus for forming pixels by the micro mirrors provides faster response speed and brighter and high-contrast image than those of LCD and thus, is suitable for providing a compact projector of high-intensity and high-quality image.

As a projector apparatus employing the aforementioned DMD as a light valve, there has also been developed a single-plate type projector apparatus using a rotation color filter and a TIR prism in an optical system for illuminating on DMD on and output the image from the DMD. In this DMD projector apparatus, the characteristic of the prism greatly depends on the incident angle has not been changed. Therefore, not only the LCD projector apparatus but also the DMD projector apparatus require a projection zoom lens system having a telecentric incident side.

In recent years, a projector apparatus being compact, light-weighted, thin and easy to carry has been increasingly required. Accompanied with this trend, the smaller size and higher-performance projection zoom lens system has been further required. That is, the small and wide-angle projection zoom lens system suitable for high-intensity and high-resolution image, and having sufficient relative illumination is needed.

Thereupon, it is an object of the present invention to provide a projection lens system that is small, especially small in diameter, bright as the F-number is about 2.0 at the wide-angle end, and wide angle as the half field angle is 25 degree or larger. In addition to the above feature above, it is an object of this invention to provide the projection lens system having sufficient relative illumination and excellent aberration performance. Further, it is another object of the invention to provide a compact projector apparatus capable of displaying a bright, high resolution and high contrast image using the thin and small projection zoom lens system of this invention.

SUMMARY OF THE INVENTION

A projection zoom lens system of the present invention having a telecentric incident side includes a first lens group having a negative refractive power, a second lens group having a positive refractive power, a third lens group having a positive refractive power, a fourth lens group having a negative refractive power and a fifth lens group having a positive refractive power lens group, arranged in this order from a screen side. The projection zoom lens system of this invention is capable of zooming by fixing the first and fifth lens groups and moving the second, third and fourth lens groups. Further, a lens of the first lens group located closest to the screen (forward or front lens) is a screen side convex negative refractive power meniscus lens.

The projection zoom lens system of the invention has an arrangement of lens groups negative, positive, positive, negative and positive, total five lens groups, sequentially in this order from the screen side (zoom-in or magnification side) to the incident side (zoom-out or reduction side). Since this lens system is basically a combination of retro focus type, an extremely long back focus can be secured, and the incident side can be formed into a telecentric state or the state which is extremely close thereto.

As the first lens group has negative power, the present projection zoom lens system is bright with reduced F-number and wide angle with large field angle even if the size of lens system is compact. Further, by causing the second and third lens groups to move independently, the resultant projection zoom lens exhibits compactness and excellent aberration performance.

In the projection zoom lens system of the invention, the front lens of the lenses of the first lens group that is located closest to the screen is the meniscus lens having negative refractive power. The front lens located closest to the screen will be the largest diameter lens in the projection zoom lens system. However, applying the negative meniscus lens for the front lens, wide field angle and large relative illumination can be secured by the small diameter front lens. This makes it possible to reduce the diameter and thickness of the entire size of the zoom lens system of this invention, and to provide a lens system suitable for projecting a large, bright and high-resolution image. Therefore, according to the present invention, it is possible to provide a small and thin projection zoom lens system having lens diameter of approximately 50 mm or less, brightness with the F-number of around 2 at a wide-angle end (wide angle extremity), wide zoom lens of half field angle of around 25 degree, and able to project an image bright enough up to the marginal area.

Accordingly, by employing the projection zoom lens system of this invention, and by incorporating an image-forming apparatus such as LCD or DMD capable of supplying a projection image at the incident side of the projection zoom lens system, it is possible to provide a small and thin projector apparatus capable of projecting a high-quality image. Especially, in this invention, the diameter of the projection zoom lens system can be reduced to about 50 mm or less and it is bright, wide-angle zoom and has well corrected aberration leading excellent optical performance. Therefore, by the projection zoom lens system of the present invention, it is possible to provide a projector apparatus movable in size and high quality in image projected.

In the projection zoom lens system of the present invention, in order to further reduce its size and enhance the aberration performance, it is preferable that a focal length (composite or resultant focal length, same for the other focal length in this specification) f1 of the first lens group and a focal length at the wide-angle end fw of the projection zoom lens system satisfy the following condition.

$$-1.9 < f1/fw < -0.9 \quad (A).$$

If f1/fw is less than the lower limit (−1.9), the refractive power of the first lens group is weakened and thus, the lens diameter is increased, and it makes difficult to achieve both reduction in the lens diameter and enhancement of aberration correction. On the other hand, if the f1/fw exceeds the upper limit (−0.9), since the refractive power of the first lens group is increased, it is difficult to well correct the aberration.

It is also important to set the powers of the fourth and fifth lens groups in appropriate ranges. By appropriately selecting the powers of these lens groups, it is possible to provide the projection zoom lens system having good balance in which the difference of the diameter among lenses constituting the first to fifth lens groups becomes small enough. Therefore, it is possible to provide a compact projection zoom lens system that is thin or slim as a whole and exhibits excellent image-forming performance. It is preferable that a focal length (composite focal length of two groups) at the wide-angle end fw45 of said fourth and fifth lens groups and said focal length fw satisfy the following condition.

$$1.6 < fw45/fw < 2.0 \quad (B).$$

If fw45/fw is less than the lower limit (1.6), the power is excessively enhanced and it is difficult to well correct the aberration. On the other hand, if fw45/fw exceeds the upper limit (2.0), since the power is so weakened, the overall length is increased, which makes it difficult to achieve reduction in size while keeping the good aberration correction.

BRIEF DESCRIPTION OF THE DRAWINGS

The aforementioned and other objects and advantages of the present invention will become apparent to those skilled in the art upon reading and understanding the following detailed description with reference to the accompanying drawings.

In the drawings.

DESCRIPTION OF THE PREFERRED EMBODIMENTS

Embodiment 1

Figure 1:
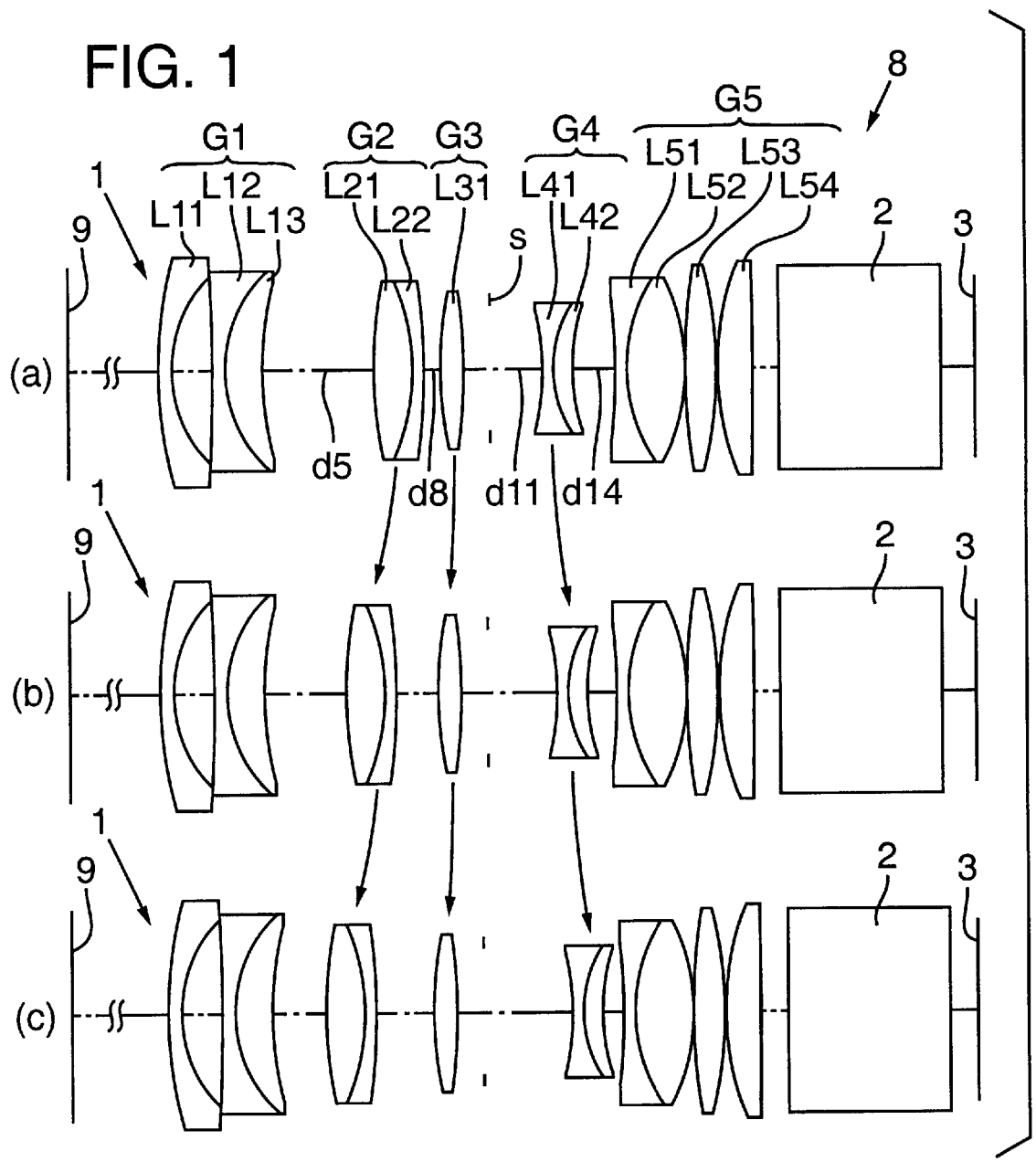
FIG. 1 is a schematic view showing a configuration of a projection zoom lens system and a projector apparatus according to Embodiment 1 of the present invention at a wide-angle end (a), a telephoto end (c), and medium (b)
Figure 7:
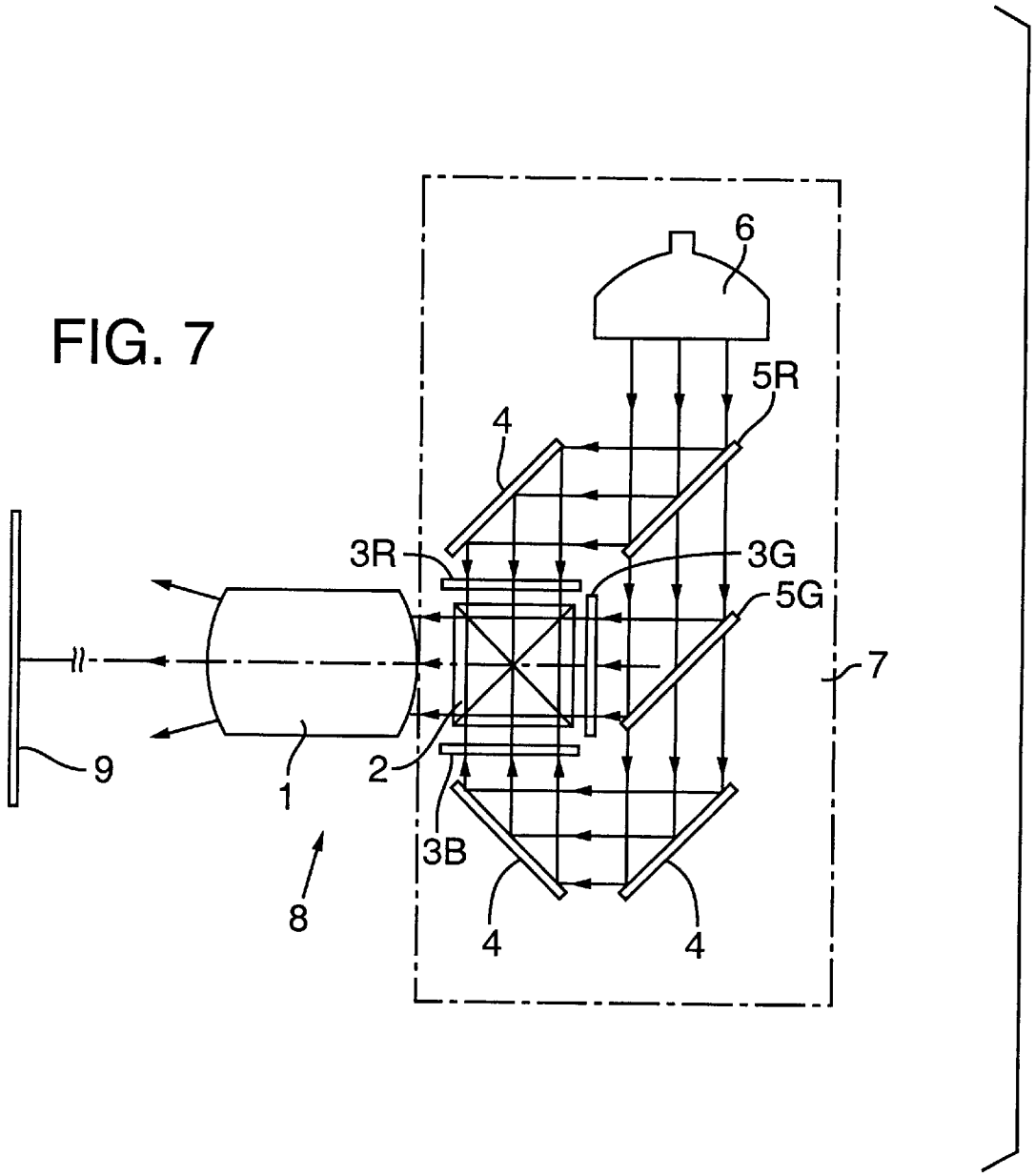
FIG. 7 shows a schematic structure of a three-plate type projector apparatus.

FIG. 1 shows an optical system of a projector 8 using a projection zoom lens system 1 according to a first embodiment of the present invention. The entire structure of the projector 8 was previously explained referring to FIG. 7. Images of each color formed by LCD's 3 are compounded by a dichroic prism 2. The color image is led to the projection zoom lens system 1 and projected onto a screen 9.

FIG. 1 shows locations of the respective lenses in the states of the projection zoom lens system 1. FIG. 1 (*a*) shows positions of lenses at a wide-angle end corresponding to the state for magnifying and displaying. FIG. 1 (*c*) shows a telephoto end corresponding to a standard state. FIG. 1 (*b*) shows the medium or intermediate state between the former two states. The projection zoom lens system 1 of the present embodiment consists of twelve lenses L11 to L54 which are divided into five lens groups G1, G2, G3, G4 and G5. Details of each lens are listed below. The projection zoom lens system 1 is capable of zooming from the wide-angle end to the telephoto end by varying a distance d5 between the first and second lens groups, a distance d8 between the second and third lens groups, a distance d11 between the third and fourth lens groups, and a distance d14 between the fourth and fifth lens groups.

The first lens group G1 located closer to the screen is a lens group having a negative refractive power as a whole. The first lens group G1 has an arrangement of, sequentially from the side of screen 9 (hereinafter screen side), an independent screen side convex negative power meniscus lens L11, a biconcave negative lens L12, and a screen side convex positive meniscus lens L13 forming a negative power doublet with the lens L12.

The second lens group G2 is a lens group having a positive refractive power as a whole, and has an arrangement of, from the screen side, a biconvex positive lens L21, and a screen side concave namely incident side convex negative meniscus lens L22 forming a doublet with the lens L21. The third lens group G3 is formed of a biconvex positive lens L31. A diaphragm (stop) S is disposed at the incidence side of the third lens group G3, and is moved together with the third lens group G3.

The fourth lens group G4 is a lens group having a negative refractive power as a whole, and has an arrangement of, from the screen side, a biconcave negative lens L41, and a screen side convex positive meniscus lens L42 forming a doublet with the lens L41.

The last lens group G5 is a lens group having a positive refractive power as a whole, and formed of, from the screen side, a biconcave negative lens L51, a biconvex positive lens L52 forming a doublet with the lens L51, a biconvex positive lens L53, and a screen side convex positive lens L54.

As explained above, the lens system of this embodiment 1 including negative, positive, positive, negative and positive five groups is combined arrangement of the retro focuses, and it is likely to make the back focus of the incident side to be extremely long telecentric or almost telecentric. The second and third lens groups G2 and G3, both are positive but independently moved so as to make it easier to correct the aberration.

In the lens system 1 of the present embodiment, accompanied with the movement from the wide-angle end to the telephoto end, the second and third lens groups G2 and G3 approach the first lens group G1 as a whole, but a moving distance of the third lens group G3 is small. Therefore, the second lens group G2 and the third lens group G3 are moved such that the distance therebetween is increased at the telephoto end. Thus, the stop S which moves together with the third lens group G3 does not move so much from the wide-angle end toward the telephoto end. On the other hand, the fourth lens group G4 moves in the direction approaching the fifth lens group G5 according to the movement from the wide angle to the telephoto end.

That is, in the case of the projection zoom lens system of the present embodiment (also in the subsequent embodiments), when zooming is performed from the wide-angle end to the telephoto end, the distances among the lens groups are controlled such that the distance between the first lens group G1 and the second lens group G2 is reduced, the distance between the second lens group G2 and the third lens group G3 is increased, the distance between the third lens group G3 and the fourth lens group G4 is increased, and the distance between the fourth lens group G4 and the fifth lens group G5 is reduced. The stop is disposed at the incident side of the third lens group G3 and moved together with the third lens group G3.

In the projection zoom lens system 1 of the present embodiment, the front or forward lens L11 located closest to the screen 9 is the screen side convex negative meniscus lens. Therefore, the larger field angle with respect to the lens diameter can be secured. Further, sufficient relative illumination can be secured with a smaller lens diameter. Therefore, it is possible to provide a small diameter, thin or slim structured projection zoom lens system having brightness with small F-number and wide-angle zooming.

In this manner, in the projection zoom lens system 1 of the present embodiment, since the lens located closest to the screen, whose diameter is usually the greatest, is a negative meniscus lens, its diameter can be reduced and it makes possible to reduce the diameter of the whole lens system 1. At the same time, by setting composite focal lengths of the fourth lens group G4 and the fifth lens group G5 within appropriate ranges, lens diameters constituting the each lens groups become well-balanced. Therefore, the great differences hardly exist among the lens diameters of the whole lens groups. Even though the projection zoom lens system is thin as a whole, lens surfaces constituting the respective lens groups can be effectively utilized. For this reason, it is possible to provide smaller projection zoom lens system for realizing higher aberration performance.

In order to provide a compact projection zoom lens system for realizing excellent aberration performance, as mentioned, it is preferable that a focal length f1 of the first lens group G1 and a focal length at the wide-angle end (extremity) fw of the projection zoom lens system satisfy the condition (A) described above. Further, it is preferable that a focal length at the wide-angle end fw45 of the fourth lens group G4 and the fifth lens group G5, and the focal length fw satisfy the condition (B). The projection zoom lens system I of the present embodiment is designed to satisfy the aforementioned conditions as shown below.

In lens data shown below;
ri is the radius of curvature (mm) of each of the lenses arranged sequentially from the screen side;
di is the distance (mm) between the adjacent lens surfaces arranged sequentially from the screen side;
ni is the refractive rate (d line) of the lens arranged sequentially from the screen side;
vi is the Abbe number (d line) of the lens arranged sequentially from the screen side;
f is a focal length (mm) of the lens system;
fw is a focal length at the wide-angle end of the lens system;
f1 is a focal length of the first lens group G1;
fw45 is a focal length at the wide-angle end of the lens group G4 and G5;
Bfw is a back focus (mm) at the wide-angle end;
FNo is a F-number, and
inf in the data represents a stop or a prism surface.

| Lens Data (No. 1) | | | | | |
|---|---|---|---|---|---|
| i | ri | di | ni | vi | note |
| 1 | 77.672 | 2.300 | 1.58913 | 61.3 | lens L11 |
| 2 | 25.660 | 7.890 | | | |
| 3 | −2206.735 | 2.500 | 1.56732 | 42.8 | lens L12 |
| 4 | 25.634 | 7.400 | 1.78590 | 43.9 | lens L13 |
| 5 | 62.369 | d5 | | | |
| 6 | 75.157 | 7.400 | 1.80450 | 39.6 | lens L21 |
| 7 | −45.376 | 2.100 | 1.84666 | 23.8 | lens L22 |
| 8 | −188.221 | d8 | | | |
| 9 | 69.446 | 4.300 | 1.77250 | 49.6 | lens L31 |
| 10 | −145.460 | 5.100 | | | |
| 11 | inf | d11 | | | stop S |
| 12 | −41.536 | 2.100 | 1.54814 | 45.8 | lens L41 |
| 13 | 23.255 | 3.700 | 1.84666 | 23.8 | lens L42 |
| 14 | 40.319 | d14 | | | |
| 15 | −171.450 | 2.300 | 1.84666 | 23.8 | lens L51 |
| 16 | 31.065 | 11.100 | 1.58913 | 61.3 | lens L52 |
| 17 | −46.390 | 0.200 | | | |
| 18 | 111.623 | 5.500 | 1.62041 | 60.3 | lens L53 |
| 19 | −111.623 | 0.200 | | | |
| 20 | 50.969 | 6.400 | 1.62299 | 58.1 | lens L54 |
| 21 | 1567.768 | 5.000 | | | |
| 22 | inf | 30.000 | 1.51680 | 64.2 | prism 2 |
| 23 | inf | 6.158 | | | |

| | Wide-angle | Medium | Telephoto |
|---|---|---|---|
| f | 34.080 | 38.100 | 42.600 |
| FNo | 2.02 | 2.14 | 2.29 |
| d5 | 21.054 | 15.562 | 10.544 |
| d8 | 3.534 | 8.162 | 11.016 |
| d11 | 9.821 | 13.153 | 17.150 |
| d14 | 7.978 | 5.510 | 3.676 |

The distances above are obtained when an image was formed at a position 3 m away from the front end of the lens system.

Various numeric values of this projection zoom lens system of the present embodiment are as follows:
f1=−49.2
fw45=61.88
Bfw=30.94 (in air)
Field angle (half angle) at the wide-angle end: 25.8°
Parameters defined in the above conditions (A) and (B) are as follows:
condition (A) f1/fw=−1.44
condition (B) fw45 fw=1.82

The projection zoom lens system 1 of the present embodiment is an extremely bright zoom lens system having magnification of 1.25 times and F-number is about 2. Further, the field angle (half angle) is as wide as 25 degree or greater. Also, the diameter of the front lens L11 is about 45 mm, which is extremely small. Therefore, it is possible to reduce the outer diameter of the projection zoom lens system to about 50 mm or less including housing for this lens system.

Figure 2:
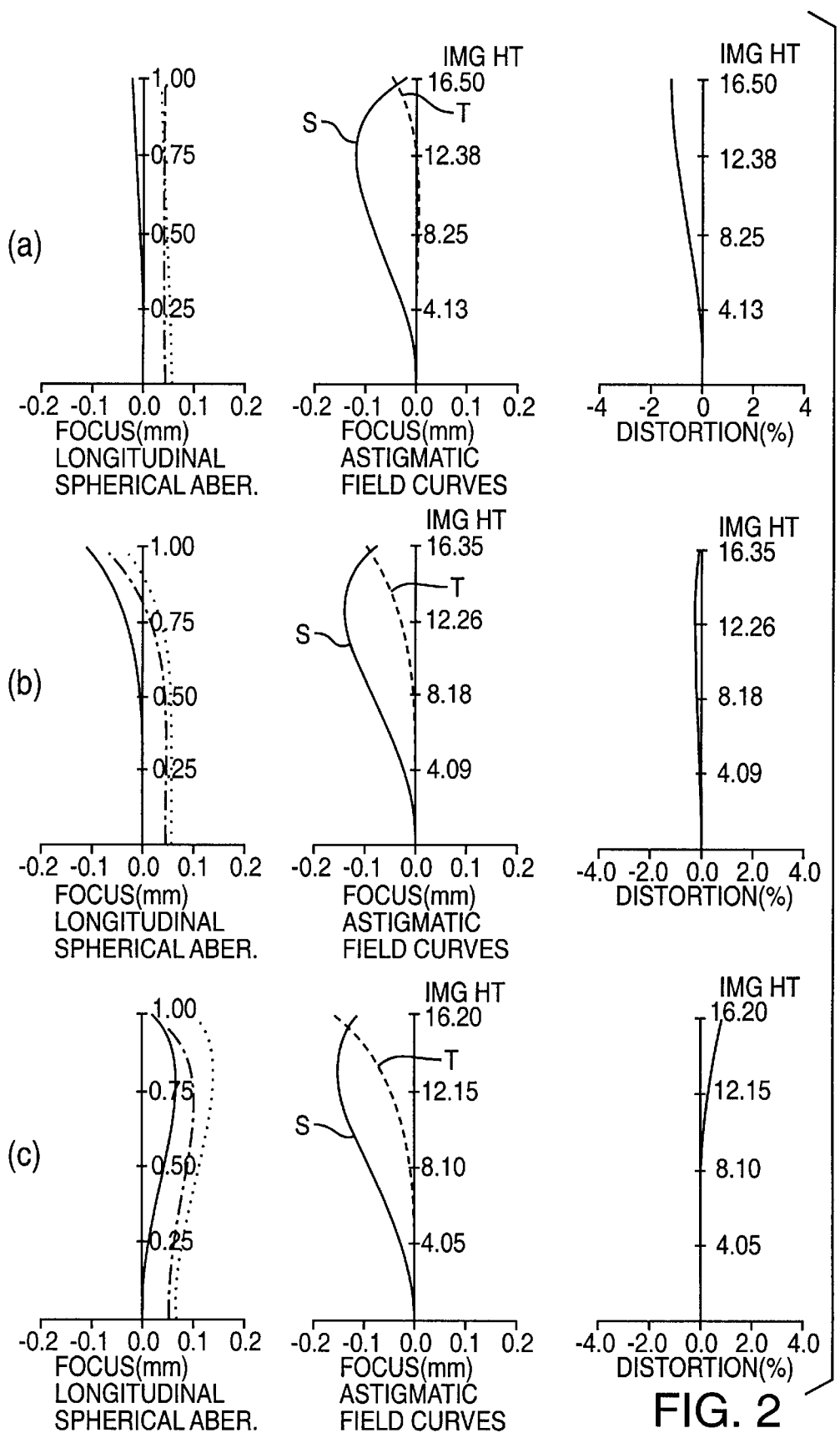
FIG. 2 shows vertical aberration of the lens system of the Embodiment 1 at the wide-angle end (a), the telephoto end (c), and the medium portion (b)

FIG. 2 shows spherical aberration, astigmatic aberration and distortion at the wide-angle end (a), the telephoto end (c) and the medium state (b) of this projection zoom lens system. The spherical aberration is shown by the light of the wavelength of 656.0 nm (broken line), 587.0 nm (solid line) and 450.0 nm (dot-dash line). As the astigmatic aberration, aberration of tangential beam (T) and aberration of sagittal beam (S) are shown. As shown in FIG. 2, the present projection zoom lens system has the arrangement of lenses and the power balance satisfies this invention including the conditions of (A) and (B). Therefore, excellent aberration correction is performed over the entire zoom region. Furthermore, even through it has the telecentric incident side, wide-angle and brightness, its size can be reduced into an extremely compact, thin and slim, the resultant lens diameter is about 45 mm, and the overall length is about 110 mm.

The projection zoom lens system 1 of the present embodiment is suitable for the projector apparatus that uses LCD or DMD as a light valve and a dichroic prism or TIR prism and the like for making the color images. Accordingly, it is possible to remarkably reduce a thickness of the entire size of the projector apparatus above by the projection zoom lens system of this invention. Further, since the incident side of the projection zoom lens system of the present embodiment is telecentric, it hardly depends on the light beam direction. Therefore, the projection zoom lens system is suitable for the projector apparatus including an image-forming apparatus for compounding or forming a projection image using an optical element that is likely to depend on the angle not only the dichroic prism or TIR prism. It is, thus, possible to reduce the size of these projector apparatus so as to be easily carried out.

Embodiment 2

Figure 3:
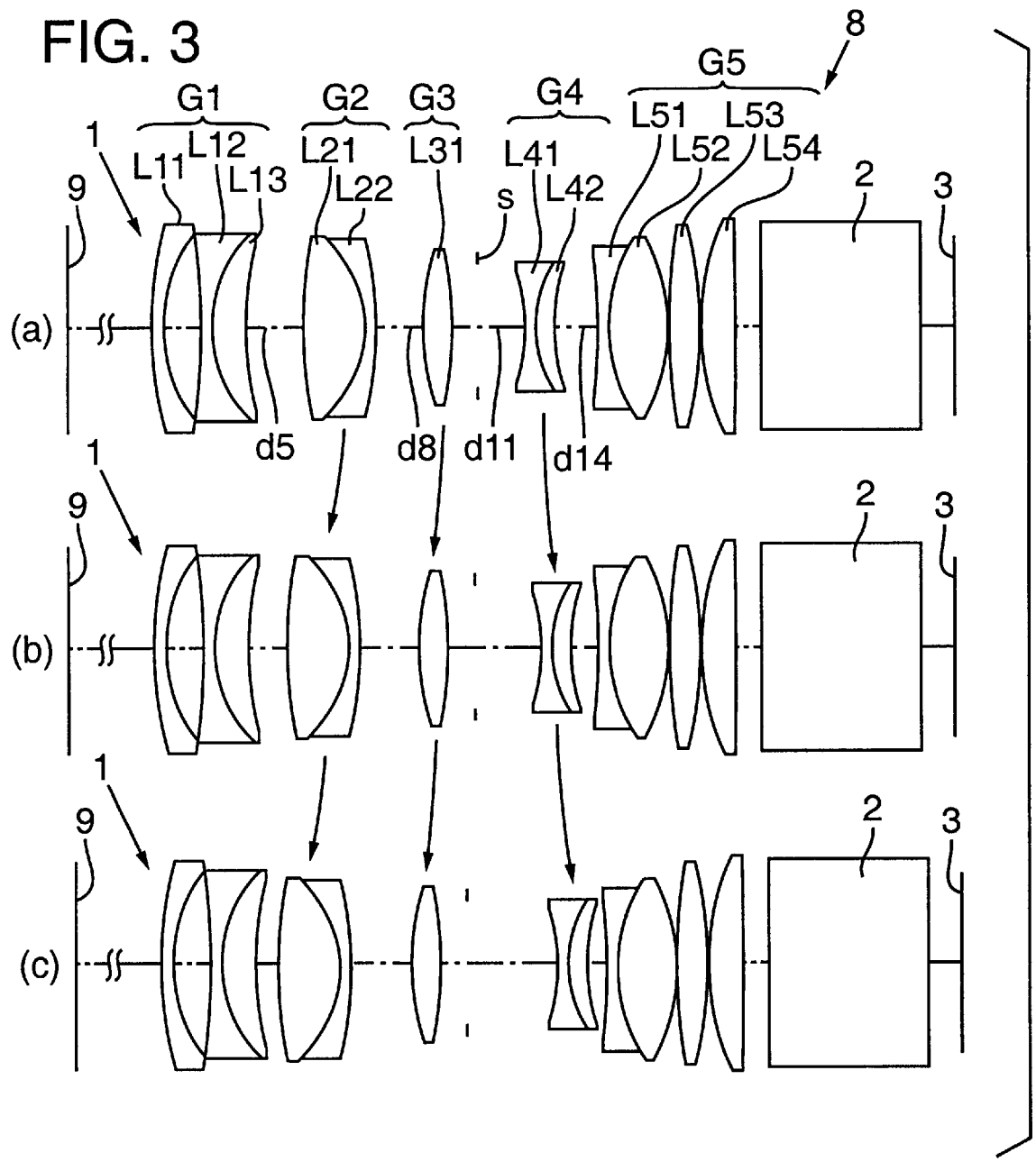
FIG. 3 is a schematic view showing a configuration of a projection zoom lens system and a projector apparatus according to Embodiment 2 of the present invention at a wide-angle end (a), a telephoto end (c), and medium (b)

FIG. 3 shows an optic system of a projector using a projection zoom lens system according to the embodiment 2 of this invention. FIG. 3 mainly shows arrangements of the respective lenses at the wide-angle end, the medium state and the telephoto end as same as FIG. 1 above. The projection zoom lens system 1 of the present embodiment also includes twelve lenses L11 to L54 which are divided into five lens groups G1, G2, G3, G4 and G5. Lens data of these lenses are shown below. General characteristic of each lens group and type of each lens constituting the groups are the same as those of the embodiment 1 above.

Lens data, symbols and aberration diagrams are shown in the same manner as that of the embodiment 1.

Lens Data (No. 2)

| i | ri | di | ni | vi | note |
|---|---|---|---|---|---|
| 1 | 69.977 | 2.300 | 1.71700 | 48.0 | lens L11 |
| 2 | 27.143 | 7.200 | | | |
| 3 | −356.519 | 2.500 | 1.68893 | 31.2 | lens L12 |
| 4 | 26.022 | 6.500 | 1.84666 | 23.8 | lens L13 |
| 5 | 53.913 | d5 | | | |
| 6 | 69.191 | 11.500 | 1.80610 | 33.3 | lens L21 |
| 7 | −25.615 | 2.100 | 1.84666 | 23.8 | lens L22 |
| 8 | −114.678 | d8 | | | |
| 9 | 51.028 | 5.700 | 1.69680 | 55.5 | lens L31 |
| 10 | −101.641 | 5.100 | | | |
| 11 | inf | d11 | | | stop S |
| 12 | −36.011 | 2.100 | 1.51742 | 52.2 | lens L41 |
| 13 | 26.340 | 3.400 | 1.84666 | 23.8 | lens L42 |
| 14 | 38.609 | d14 | | | |
| 15 | −151.707 | 2.300 | 1.84666 | 23.8 | lens L51 |
| 16 | 35.123 | 11.100 | 1.58913 | 61.3 | lens L52 |
| 17 | −43.939 | 0.200 | | | |
| 18 | 108.685 | 5.700 | 1.62041 | 60.3 | lens L53 |
| 19 | −110.134 | 0.200 | | | |
| 20 | 48.158 | 6.400 | 1.62280 | 56.9 | lens L54 |
| 21 | 347.812 | 5.000 | | | |
| 22 | inf | 30.000 | 1.51680 | 64.2 | prism 2 |
| 23 | inf | 6.534 | | | |

| | Wide-angle | Medium | Telephoto |
|---|---|---|---|
| f | 34.082 | 38.097 | 42.602 |
| FNo | 2.02 | 2.19 | 2.38 |
| d5 | 10.994 | 7.139 | 3.930 |
| d8 | 9.553 | 11.756 | 12.137 |
| d11 | 9.246 | 13.503 | 18.241 |
| d14 | 8.357 | 5.752 | 3.843 |

The distances above are obtained when an image was formed at a position 3 m away from the front end of the lens system.

Various numeric values of this projection zoom lens system of the present embodiment are as follows:
f1=−34.0
fw45=62.18
Bfw=31.36 (in air)
Field angle (half angle) at the wide-angle end: 25.8°
Parameters defined in the above conditions (A) and (B) are as follows:
Condition (A): f1/fw=−1.00
Condition (B): fw45/fw=1.82

The projection zoom lens system 1 of the present embodiment also has magnification of 1.25 times and is an extremely bright zoom lens system with F-number is about 2 at the wide angle end. Further, it is the wide zoom lens having the field angle (half angle) of larger than 25 degree. In addition, this projection zoom lens system 1 is so designed such that the power distribution satisfies the conditions (A) and (B) but the power of the first lens group G1 is slightly enhanced to the previous embodiment. Therefore, the diameter of the front lens L11 located closest to the screen is further reduced to about 40 mm, and it makes the projection zoom lens system 1 further thin and compact. However, the F-number at the telephoto end shows the tendency of being slightly increased.

Figure 4:
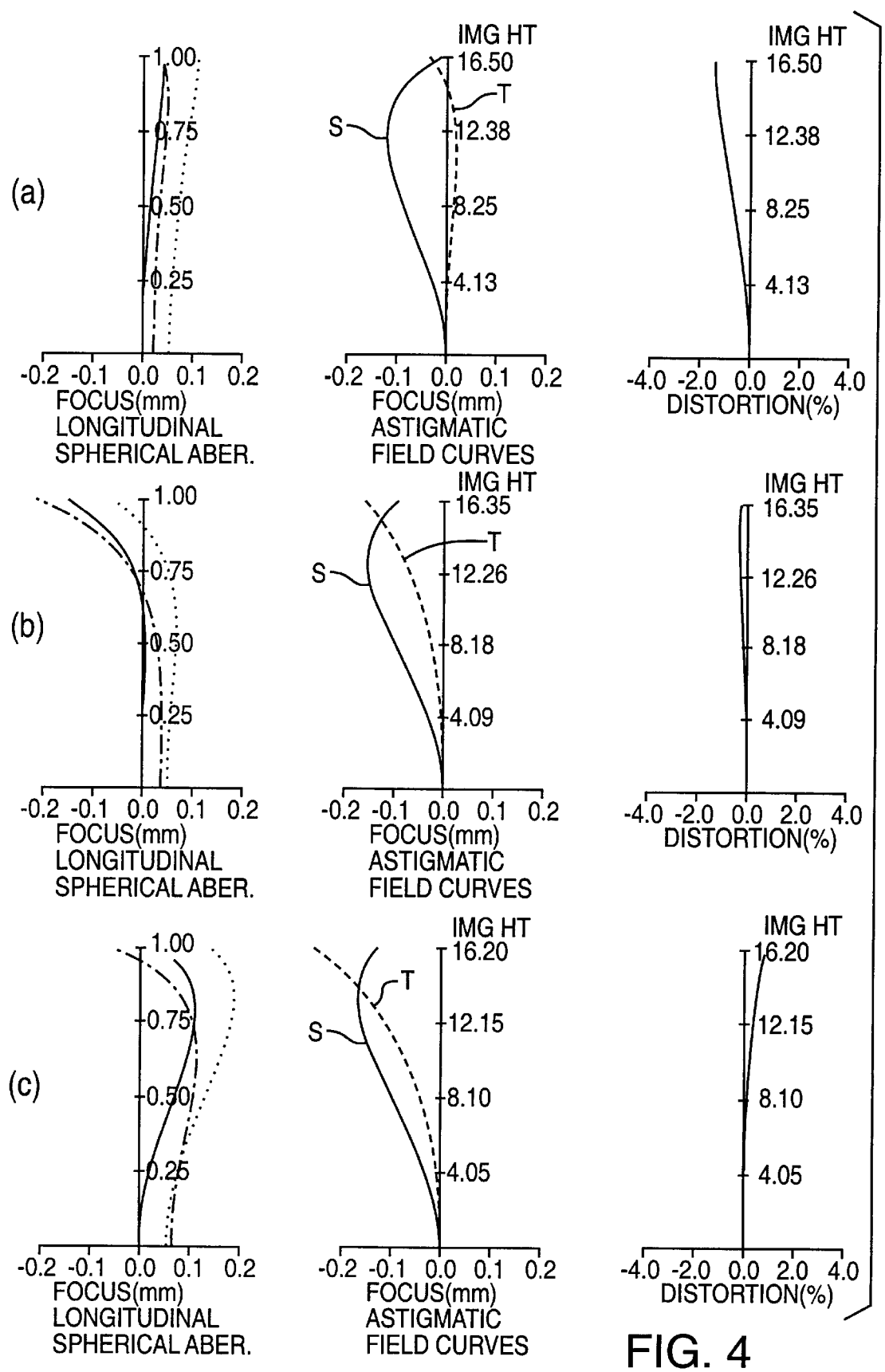
FIG. 4 shows vertical aberration of the lens system of the Embodiment 2 at the wide-angle end (a), the telephoto end (c), and the medium portion (b)

FIG. 4 shows spherical aberration, astigmatic aberration and distortion at the wide-angle end (a), the telephoto end (c) and the medium (b) of this projection zoom lens system. As can be seen in these figures, correction at the telephoto end is slightly inferior to that of the previous embodiment, but excellent aberration correction is kept in the entire zoom region in the projection zoom lens system of the present embodiment also. Therefore, even through this is a wide-angle and bright projection zoom lens system having telecentric incident side, its size can be reduced into an extremely compact to be a thin and slim lens system having the lens diameter of about 40 mm and the overall length of about 100 mm.

Embodiment 3

Figure 5:
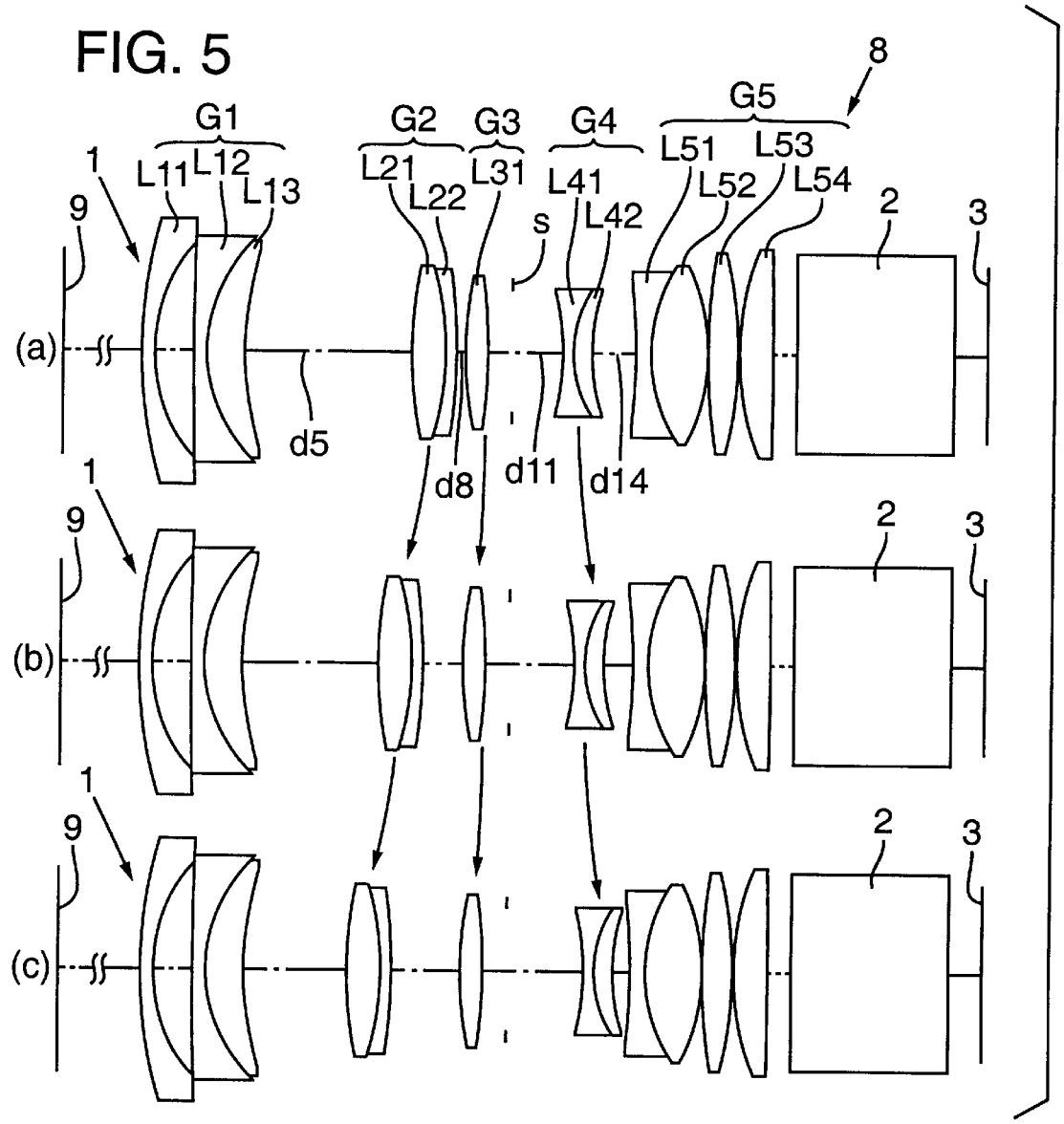
FIG. 5 is a schematic view showing a configuration of a projection zoom lens system and a projector apparatus according to Embodiment 3 of the present invention at a wide-angle end (a), a telephoto end (c), and medium (b)

FIG. 5 shows an optic system of a projector using a projection zoom lens system 1 according to a third embodiment of the invention. FIG. 5 also mainly shows arrangements of lenses at the wide-angle end, the medium state and the telephoto end. The projection zoom lens system 1 of the present embodiment also comprises twelve lenses L11 to L54 which are divided into five lens groups G1, G2, G3, G4 and G5. Lens data of these lenses are as shown below. Types of each lens groups and each lens arranged in the groups are also the same as those of the above embodiments.

| Lens Data (No. 3) | | | | | |
|---|---|---|---|---|---|
| i | ri | di | ni | vi | note |
| 1 | 80.712 | 2.300 | 1.58144 | 40.9 | lens L11 |
| 2 | 29.496 | 8.000 | | | |
| 3 | 314.140 | 2.500 | 1.48749 | 70.4 | lens L12 |
| 4 | 28.326 | 7.100 | 1.77250 | 49.6 | lens L13 |
| 5 | 50.709 | d5 | | | |
| 6 | 72.203 | 6.900 | 1.75700 | 47.7 | lens L21 |
| 7 | −60.884 | 2.100 | 1.84666 | 23.8 | lens L22 |
| 8 | −150.597 | d8 | | | |
| 9 | 75.130 | 3.900 | 1.77250 | 49.6 | lens L31 |
| 10 | −264.501 | 5.100 | | | |
| 11 | inf | d11 | | | stop S |
| 12 | −48.935 | 2.100 | 1.56732 | 42.8 | lens L41 |
| 13 | 21.718 | 4.000 | 1.84666 | 23.8 | lens L42 |
| 14 | 40.248 | d14 | | | |
| 15 | −94.253 | 2.300 | 1.84666 | 23.8 | lens L51 |
| 16 | 30.786 | 11.300 | 1.58913 | 61.3 | lens L52 |
| 17 | −42.271 | 0.200 | | | |
| 18 | 107.426 | 5.500 | 1.62041 | 60.3 | lens L53 |
| 19 | −117.494 | 0.200 | | | |
| 20 | 49.245 | 6.300 | 1.65844 | 50.9 | lens L54 |
| 21 | 455.328 | 5.000 | | | |
| 22 | inf | 30.000 | 1.51680 | 64.2 | prism 2 |
| 23 | inf | 6.460 | | | |

| | Wide-angle | Medium | Telephoto |
|---|---|---|---|
| f | 34.080 | 38.100 | 42.600 |
| FNo | 2.02 | 2.07 | 2.16 |
| d5 | 33.093 | 26.540 | 20.268 |
| d8 | 1.984 | 8.737 | 14.001 |
| d11 | 9.472 | 11.604 | 14.530 |
| d14 | 8.238 | 5.906 | 3.988 |

The distances above are obtained when an image was formed at a position 3 m away from the front end of the lens system.

Various numeric values of this projection zoom lens system of the present embodiment are as follows:
f1=−61.3
fw45=63.55
Bfw=31.23 (in air)
Field angle (half angle) at the wide-angle end: 25.8°

Parameters defined in the above conditions (A) and (B) are as follows:
Condition (A): f1/fw=−1.80
Condition (B): fw45/fw=1.86

As shown in the above, the projection zoom lens system 1 of the present embodiment also has magnification of 1.25 times and is an extremely bright zoom lens with F-number is about 2. Further, it is also wide zoom lens with the field angle (half angle) larger than 25 degree. The power balance of this projection zoom lens system 1 also satisfies the conditions (A) and (B), but the power of the first lens group G1 is slightly weakened to the previous embodiments. Therefore, the diameter of the front lens L11 located closest to the screen is slightly increased to about 50 mm, and the overall length thereof is also increased to about 120 mm. However, the F-number at the telephoto end is slightly reduced, resulting in high brightness over the entire zoom region. Further, as shown in the following aberration diagram, the aberration performance at the telephoto end is further improved, thus realizing the zoom lens system having extremely excellent aberration performance.

Figure 6:
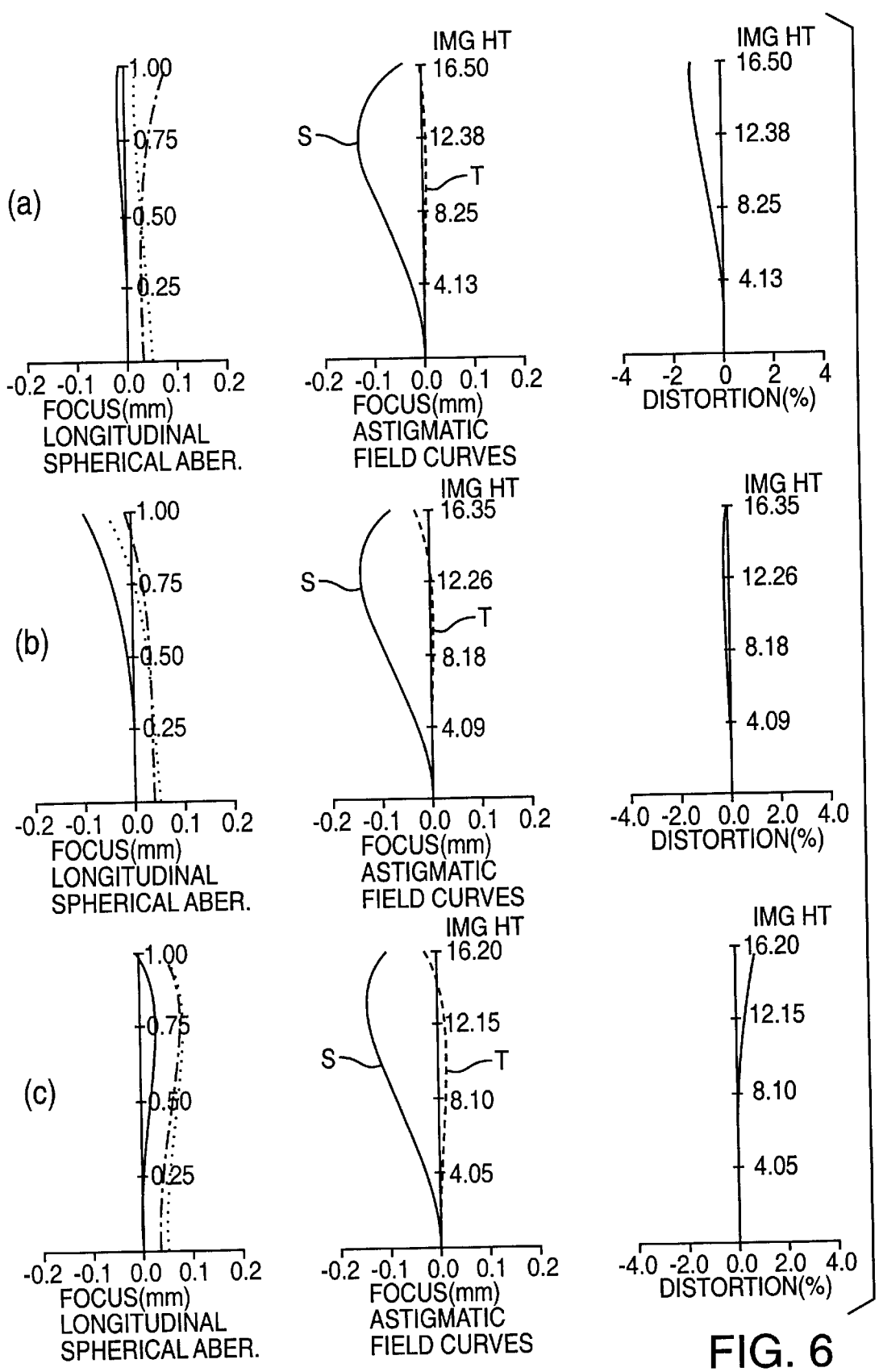
FIG. 6 shows vertical aberration of the lens system of the Embodiment 3 at the wide-angle end (a), the telephoto end (c), and the medium portion (b)

FIG. 6 shows spherical aberration, astigmatic aberration and distortion at the wide-angle end (a), the telephoto end (c) and the medium (b) of this projection zoom lens system. As can be seen in these figures, although the lens diameter and the overall length of this embodiment are slightly greater than those of the previous embodiments, further excellent aberration corrections are performed over the entire zoom region. Therefore, this projection zoom lens system has telecentric incident side and is wide-angled and bright, moreover it has sufficiently compact size.

As explained above, the projection zoom lens system of the present invention consists of the five lens groups having, from the screen side negative, positive, positive, negative and positive power, and its incident side is telecentric. By applying the negative lens to the lens located closest to the screen, the field angle and the brightness can be increased while reducing the lens diameter, moreover, the sufficient relative illumination can be also secured. Further, by designing the distribution of power of the first lens group located closest to the screen, and power of the fourth and fifth lens groups at the incident side within the above conditions (A) and (B), the projection zoom lens system being smaller, its the aberration is well corrected and having extremely excellent optical performance can be provided.

Therefore, the use of the projection zoom lens system of the invention leads to the projector apparatus capable of projecting a bright and high-resolution image. Further, it is possible to remarkably reduce the size of the projector apparatus into compact, and a practically portable projector apparatus can be provided.

Various other modifications will be apparent to and can be readily made by those skilled in the art without departing from the scope and spirit of this invention.

What is claimed is:

1. A projection zoom lens system having a substantially telecentric incidence side, comprising a first lens group having a negative refractive power, a second lens group a positive refractive power, a third lens group having a positive refractive power, a fourth lens group having a negative refractive power and a fifth lens group having a positive refractive power, arranged in this order from a screen side, whereby zooming is carried out by fixing said first and fifth lens groups and moving said second, third and fourth lens groups, and wherein a lens of said first lens group located closest to said screen is a screen side convex negative refractive power meniscus lens.

2. A projection zoom lens system according to claim 1, wherein a focal length f1 of said first lens group and a focal length at a wide-angle end fw of said projection zoom lens system satisfy the following condition:

$-1.9 < f1/fw < -0.9.$

3. A projection zoom lens system according to claim 2, wherein a focal length at the wide-angle end fw45 of said fourth and fifth lens groups and said focal length fw satisfy the following condition:

$1.6 < fw\mathbf{45}/fw < 2.0.$

4. A projector apparatus comprising a projection zoom lens system according to claim 1, and an image-forming apparatus capable of supplying a projection image to the incident side of said projection zoom lens system.

* * * * *